April 12, 1932.   C. H. KIRBY   1,853,623
VACUUM OPERATED HEAT CONTROL
Filed Dec. 12, 1927   2 Sheets-Sheet 1
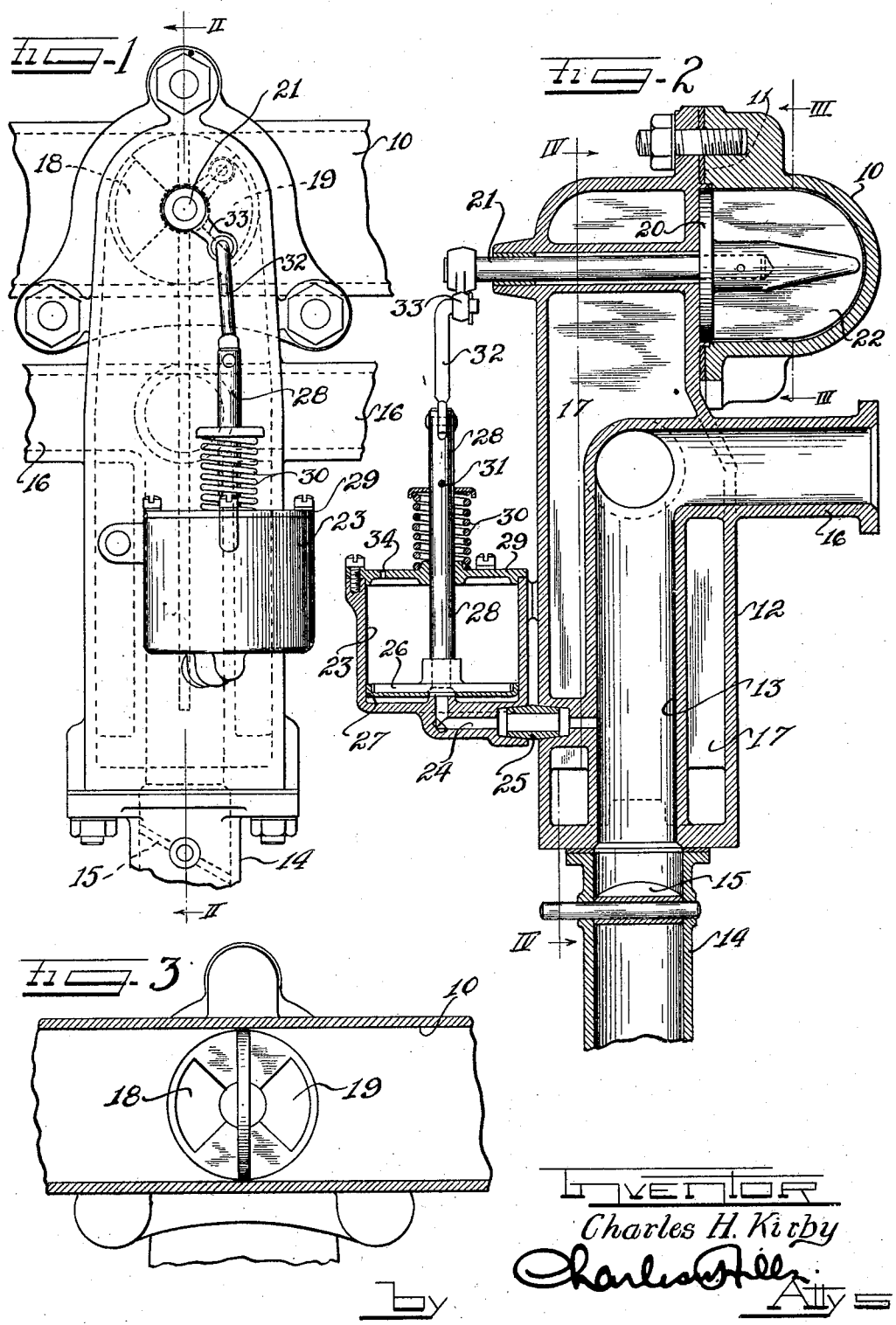
Inventor
Charles H. Kirby

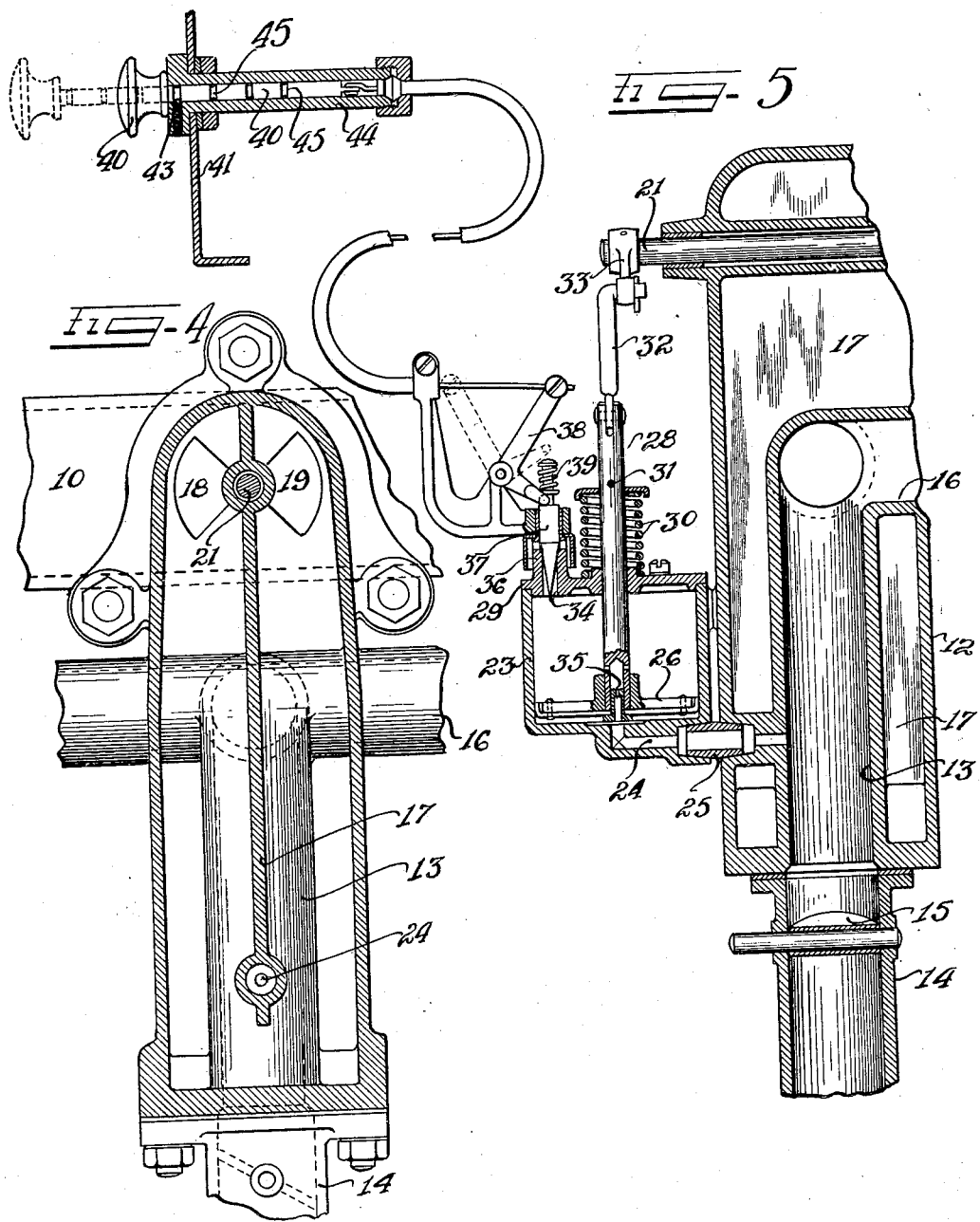

Patented Apr. 12, 1932

1,853,623

UNITED STATES PATENT OFFICE

CHARLES H. KIRBY, OF FLINT, MICHIGAN, ASSIGNOR TO MARVEL CARBURETER COMPANY, A CORPORATION OF ILLINOIS

VACUUM OPERATED HEAT CONTROL

Application filed December 12, 1927. Serial No. 239,373.

This invention relates to a vacuum operated heat control for the exhaust jacketed intake manifold of an internal combustion engine.

It is an object of this invention to provide a heat control for bypassing varying amounts of exhaust gases through the jacketed intake manifold in accordance with varying conditions of operation of the engine. I have found that the suction in the intake manifold varies in proportion to the desirable heating effect. When an engine is operating at full throttle, the least heat gives the most power output, and the intake manifold suction pressure drop is least. At the other operating extreme, namely, idling, a maximum heating effect is desirable to assure satisfactory and even idling at the least practical expenditure of fuel and under these conditions, the throttle is nearly closed, creating a maximum suction pressure drop in the manifold above the throttle. When the engine suction pressure drop is low and is laboring at slow speed, heating is undesirable, while at high speeds the pressure drop is sufficient to operate the heat control to produce the desired heating effect, a result not obtainable with a direct operating connection between the throttle and the heat control is undesirable because of the varying heat requirements at full throttle.

It is also an object of this invention to provide a manual adjustment for varying the effect of the vacuum operated heat control.

It is another object of this invention to provide a simple easily manufactured and serviced device of the class described that will be reliable and automatic in operation.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevation of the exhaust and intake manifolds of an engine to which a device embodying the features of this invention has been applied.

Figure 2 is a vertical section on the line II—II of Figure 1.

Figure 3 is a fragmentary section on the line III—III of Figure 2.

Figure 4 is a vertical section on the line IV—IV of Figure 2.

Figure 5 is a section similar to Figure 2 showing the application of a manual control for regulating the automatic operation of the device of this invention.

As shown on the drawings:

An exhaust manifold 10 is provided with a flanged side opening 11 to which is bolted a bypass jacket 12 integral with and surrounding the uptake 13 from a carbureter connection 14 having a throttle valve 15; the intake manifold also having side branches 16 extending through the walls of the jacket. The jacket 12 is provided with a central partition 17 extending nearly to the bottom thereof, ports 18 and 19 opening into the exhaust manifold on either side of the partition so that the by-pass path of the exhaust gases comprises entry at one of the ports 18 or 19, thence downwardly on one side of the partition around the lower edge thereof and upwardly along the other side, exhausting back into the exhaust manifold through the other of the ports 18 or 19. A segmentally apertured disc 20 is carried by a shaft 21, this disc being adapted to simultaneously cover and uncover the two ports 18 and 19. An outstanding plate 22 is also carried by the disc, the plate serving to substantially block the exhaust manifold between the by-pass ports when the by-pass ports are fully open, thus causing a nearly complete diversion of the exhaust gases through the jacket.

A cylindrical casing 23 is bolted to the side of the jacket 12 and has a passage 24 connecting to the interior of the uptake 13 through a double tapered plug 25 which seats in tapered recesses in the casing and jacket. In the simple or non-regulated form of the invention disclosed in Figures 1 and 2, a piston 26 with a cup leather seal 27 is mounted on a piston rod 28 which is journaled in a cover 29, the rod and piston being urged upwardly by a spring 30 acting against a pin 31 in the rod. A link 32 connects the upper end of the rod to a lever 33 pinned to the shaft 21. The cover 29 is provided with a vent hole 34 to break the vacuum behind the piston.

In the operation of this primary form of the invention, the suction in the intake manifold is communicated through the passage 24 to beneath the piston 26 in the cylindrical casing 23, tending to pull the piston downwardly to rotate the by-pass valve into operative position, the various parts being shown in their extreme positions in Figure 2. The downward movement of the piston and rod meets an increasing resistance in the spring 30 proportional to the extent of the movement, so that the movement of the piston and valve is proportional to the suction pressure drop in the intake manifold.

The modification shown in Figure 5 relates to a manual control superimposed on the automatic form of control for regulating the effect thereof. The structure previously described is unchanged in function, the manual control being added thereto. In principle, this manual control comprises providing a restricted air passage 35 through the rod 28 from above the piston to below the piston, and in applying manual control to the vent hole 34 previously described. In operation, if this vent is entirely shut off, it will be evident that intake manifold suction would quickly be communicated to above the piston 26 so that the pressures would be equalized and the piston would not move regardless of how much the suction pressure drop should increase. If the vent hole be greatly enlarged relative to the size of the restricted passage 35, the vacuum effect on the piston will be substantially the same as if the passage 35 were omitted, as in the simple or primary form first described, and the device would operate as previously described. If this vent is then regulated in area between these two extremes, the range of operation of the automatic control will be shifted to smaller pressure differentials in the intake manifold as the vent is opened up and the manual control will thus render the automatic control more sensitive and responsive to pressure differences.

In order to accomplish this result, a boss 36 is formed on the cover 29 around the vent 34, a needle valve 37 being pressed downwardly into the vent. A bell crank lever 38 serves to lift the needle valve upwardly against the action of a spring 39, this bell crank being preferably connected to a pull rod 40 on the dash 41 by means of a Bowden wire 42. A spring pressed latch 43 is mounted in the rod guide 44 which is clamped in the dash. The pull rod 40 can be used to adjust the needle valve by convenient steps, the latch dropping into one of the several grooves 45 in the rod.

It will thus be seen that I have provided an improved automatic by-pass heat controlling mechanism that can be conveniently modified in range by means of a manual control.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination with an intake manifold heater and a control valve therefor, a vacuum control for said valve comprising movable means having a suction connection to the intake manifold and connected to said valve to operate said valve, and means adapted to vary the responsiveness of said vacuum control whereby the heating effect will be varied.

2. In combination with an intake manifold heater and a control valve therefor, a vacuum control for said valve comprising a cylinder having a suction connection to the intake manifold, a piston movable therein and connected to said valve, a restricted air passage past said piston, an air vent into the cylinder, and means adapted to vary the effective area of said air vent to vary the responsiveness of the heat control valve.

3. In combination with an intake manifold heater and a control valve therefor, a vacuum control for said valve comprising a cylinder having a suction connection to the intake manifold, a piston movable therein and connected to said valve, a restricted air passage past said piston, an air vent into the cylinder, and a manually operable needle valve adapted to vary the effective area of said air vent to vary the responsiveness of the heat control valve.

In testimony whereof I have hereunto subscribed my name at Flint, Genesee County, Michigan.

CHARLES H. KIRBY.